United States Patent [19]
Cottrell

[11] 3,713,564
[45] Jan. 30, 1973

[54] METHOD AND MEANS FOR FACILITATING THE FLOW OF GRANULAR MATERIALS

[75] Inventor: Lyle F. Cottrell, Salina, Kans.

[73] Assignee: Butler Manufacturing Company, Kansas City, Mo.

[22] Filed: June 25, 1971

[21] Appl. No.: 156,685

[52] U.S. Cl. ..........................222/1, 222/195, 259/4, 259/DIG. 17
[51] Int. Cl. ..............................................B65g 3/12
[58] Field of Search....222/195, 193, 1; 259/DIG. 17, 259/4; 34/168, 57 E; 302/46

[56] References Cited

UNITED STATES PATENTS

| | | | |
|---|---|---|---|
| 3,531,874 | 10/1970 | Sukup | 98/55 X |
| 1,029,273 | 6/1912 | Butler | 222/195 |
| 3,305,142 | 2/1967 | Caldwell | 222/195 |

Primary Examiner—Robert B. Reeves
Assistant Examiner—John P. Shannon
Attorney—Luke A. Mattare et al.

[57] ABSTRACT

A method of and means for facilitating the discharge of granular or powdery material, especially irregularly shaped particles of granular material, from a conically shaped hopper or cylindrically shaped container such as a storage bin, in which a plurality of circumferentially spaced, co-directed flat streams of compressed air are introduced into the hopper or bin portion and directed to flow thereinto approximately tangentially of the wall surface thereof, with at least some of such streams being coextensive in height with the height of such wall surface so as to form a hopper lining film of compressed air between the arch basing area of such wall surface and the wall opposing surface of the mass of material in such hopper portion that will impart a centrifugally directed agitating effect on the mass of material while also imparting a moment of force acting inwards of the wall surface due to the expansion of the film of compressed air between the wall and the wall opposing surface of the mass of material.

10 Claims, 7 Drawing Figures

PATENTED JAN 30 1973

INVENTOR
LYLE F. COTTRELL

BY Shoemaker and Mattare

ATTORNEYS

PATENTED JAN 30 1973 3,713,564

INVENTOR
LYLE F. COTTRELL
BY Shoemaker and Mattare
ATTORNEYS

METHOD AND MEANS FOR FACILITATING THE FLOW OF GRANULAR MATERIALS

BACKGROUND OF THE INVENTION

The present invention relates to the art of material handling and, more particularly, to the handling of granular or pulverulent materials.

Still more particularly, the invention relates to facilitating the flow of such materials from a storage hopper or bin that includes a conical or cylindrical lower portion communicating with an outlet.

It is known that where granular or pulverulent material, especially irregularly shaped granular material, is to be dispensed or discharged from such a storage hopper, steps must be taken to prevent bridging or arching of the material in the conical portion so that discharge flow is stopped.

Usually mechanical agitators are mounted on the conical portion of the hopper. These can be in the form of screws or vibrators. All of these mechanical agitators or flow facilitators require special controls to insure operation only when flow is desired.

Further, compressed air has been introduced into hoppers to fluidize or aerate powdery materials, such as cement. This air introduced under pressure can also pressurize the space in the hopper above the material therein so as to fluidize same and pneumatically convey the material to discharge. Usually, in fluidizing, the air is introduced through air permeable membranes associated in a variety of ways with the hopper. Due, however, to the size and shapes of irregularly shaped granular materials, aeration will not initiate flow.

It is known to prevent or relieve arching stoppage of material in a hopper by, from time to time when arching occurs, flowing air in downwardly directed jets from a series of fan-shaped nozzles arranged in and around the lower or inwardly inclined portion of the hopper.

Therefore, it is desirable to provide a method of and means for facilitating the flow of granular materials, especially irregularly shaped granular materials, that is more economical than utilizing mechanical agitators and their attendant controls, that does not require special hoppers or any substantial alternation to existing hoppers and in which a centrifugally directed agitating effect is obtained.

STATEMENT OF THE INVENTION

The invention provides a method of and means for facilitating the flow of difficult to flow materials, such as irregularly shaped granular materials, one example of which is ground plastic scrap which is stored prior to reprocessing.

The invention contemplates establishing a hopper lining film of compressed air between the conical arch basing wall of the hopper and the surface of the mass of material therein by directing circumferentially spaced sheets of air along the vertical extent of the hopper wall surface in approximately a tangential direction thereto so that the air film imparts a centrifugally directed agitating effect in addition to the inwardly directed agitating effect which results from the expansion of the air away from the hopper wall.

Especially, the invention provides a plurality of circumferentially spaced air channels extending along the vertical extent of the inner conical or cylindrical wall surface of the hopper, the outlets of all of which face in the same direction and are directed approximately tangentially of such surface. An air manifold is disposed around the exterior of the conical wall portion, and branch conduits extend from the manifold to and communicate with the air channels and a low pressure blower unit supplies air to the channels.

Since hoppers usually have what are termed radial seams providing by overlapped edges of segmental sections, an aspect of the invention contemplates installing air channel forming strips over these seams.

Specifically, the channels are formed from flat strip members which are secured along one edge and at their opposite ends to the inner wall surface of the hopper.

While the invention can contemplate a single elongated strip for the full extent of each channel, several aligned strips can be used to obtain a channel running the vertical extent of the conical wall surface.

Additionally, shorter air channels can be located between the longer channel at the upper portion of the conical surface.

BRIEF DESCRIPTION OF THE DRAWINGS

Further and more specific objects and advantages of the invention will be apparent from the following description when taken in connection with the accompanying drawings in which.

DETAILED DESCRIPTION OF PREFERRED EMBODIMENTS

Figure 1:
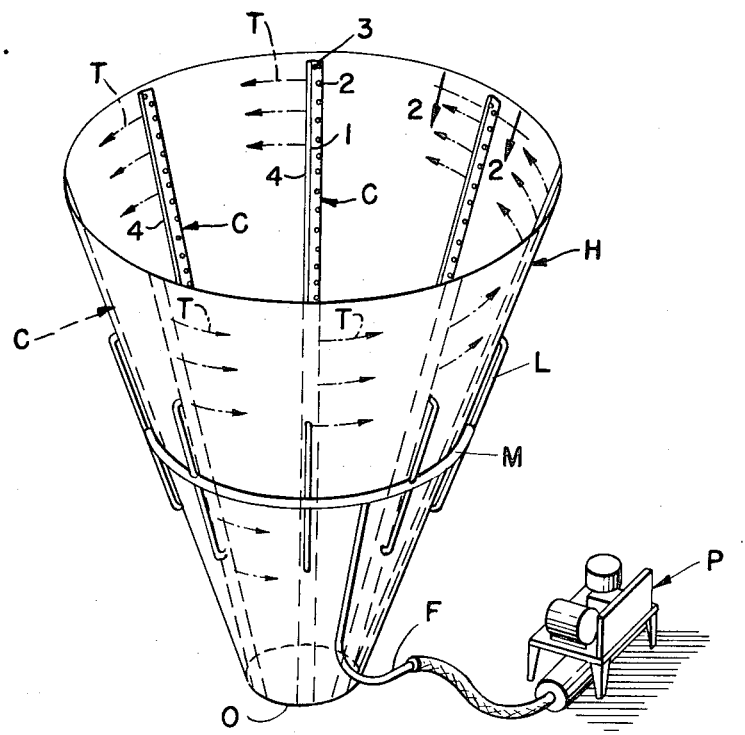
FIG. 1 is a perspective view diagrammatically illustrating the invention.
Figure 2:
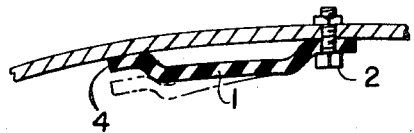
FIG. 2 is a cross-sectional view taken along line 2—2 of FIG. 1.

FIG. 1 diagrammatically illustrates a hopper embodying the invention, it being understood that the term hopper refers to the cone-shaped portion of a storage tank or bin extending from a vertical side wall structure, not shown, to a bottom outlet O. Thus, in this figure, the hopper H is provided with a series of straight circumferentially spaced air channels C on the interior wall thereof. These channels are formed by strip members 1 which are secured along one side to the hopper wall by nut and bolt means 2. The opposite ends of the channels are secured to the hopper wall by bolt means 3. This arrangement leaves one side 4 of each strip free of connection with the inner wall surface. The strips can be molded from a suitable plastic, such as neoprene, so that there is a flexibility characteristic existing along the side 4. Molded channels are not essential, it merely being necessary that the strip members are so shaped as to provide an air space and a discharge slot along one edge with a flap-like seal for such slot.

A manifold ring M is arranged around the exterior of the hopper and branch lines L extend from the manifold to openings in the hopper wall behind the respective strips. Compressed air is fed to the manifold through line F from a low pressure blower package unit P. With this arrangement, the air under pressure is directed from beneath the series of side edges to flow approximately tangentially relative to the inner hopper wall surfaces in the direction of the arrows T. These sheets of incoming air establish an air film between the hopper wall surface and the adjacent mass of granular material. The air flow exerts a centrifugal or vertical agitating effect and also exerts a component of force acting inwardly by expansion of the air film reacting against the hopper wall. This air film pushes any arched material away from the sides of the hopper by the combination of the centrifugal effect and the inward acting force. Since at least some of the air channels extend substantially throughout the vertical extent of the cone-shaped wall, the material cannot arch or bridge and will readily discharge through the bottom outlet O.

The strips 1 can be continuous or be formed in sections that are mounted in alignment. If sections are utilized, a branch line must communicate with each section.

The air streams can be introduced from time to time when arching is detected or introduced continuously during a hopper discharging operation.

Figure 4:
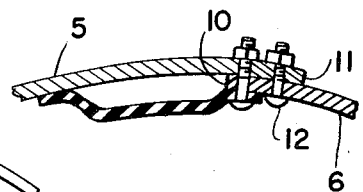
FIG. 4 is a cross-sectional view taken along lines 4—4 of FIG. 3.
Figure 3:
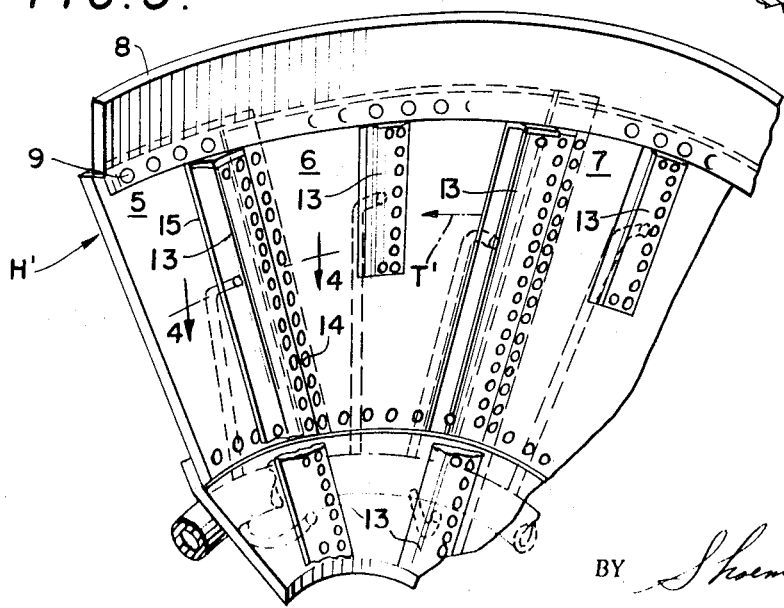
FIG. 3 is a fragmentary view illustrating a modified hopper construction.

In some hopper constructions, the conical wall is formed of segments which are bolt connected and welded together in such manner that there are radial seams on the interior of the cone section where one edge of one section overlaps the adjacent edge of the next section. FIGS. 3 and 4 illustrate an arrangement where the strips forming the air channels bridge over these seams. Thus, the hopper H' is formed of segments, such as 5, 6 and 7, it being understood that the number and size of the segments are determined by the size of the hopper. The upper ends of each of these segments are connected to the exterior of a vertical wall member 8, bolt connections 9 illustrating this connection. The left hand edge portion 10 of segment 6 overlaps the right hand end portion 11 of segment 5, and the left hand end portion of segment 7 overlaps the right hand end portion of segment 6. A vertical row of bolt and nut connections 13 connect these segments together. The strips 13 are connected along one edge to overlapping edges of the segments to extend over the left hand edges of segments 6 and 7 by bolt and nut connections 14. The flexibility characteristic of side edge 15 permits the air under pressure to flow in sheet form in the direction of arrows T'. A cone-shaped bottom ring 16 is bolt connected to the lower ends of the segments and further channel forming strips 13' are arranged on the interior thereof. Shorter channel forming strips 13 can be arranged between the longer strips in the upper portion of each segment.

Figure 5:
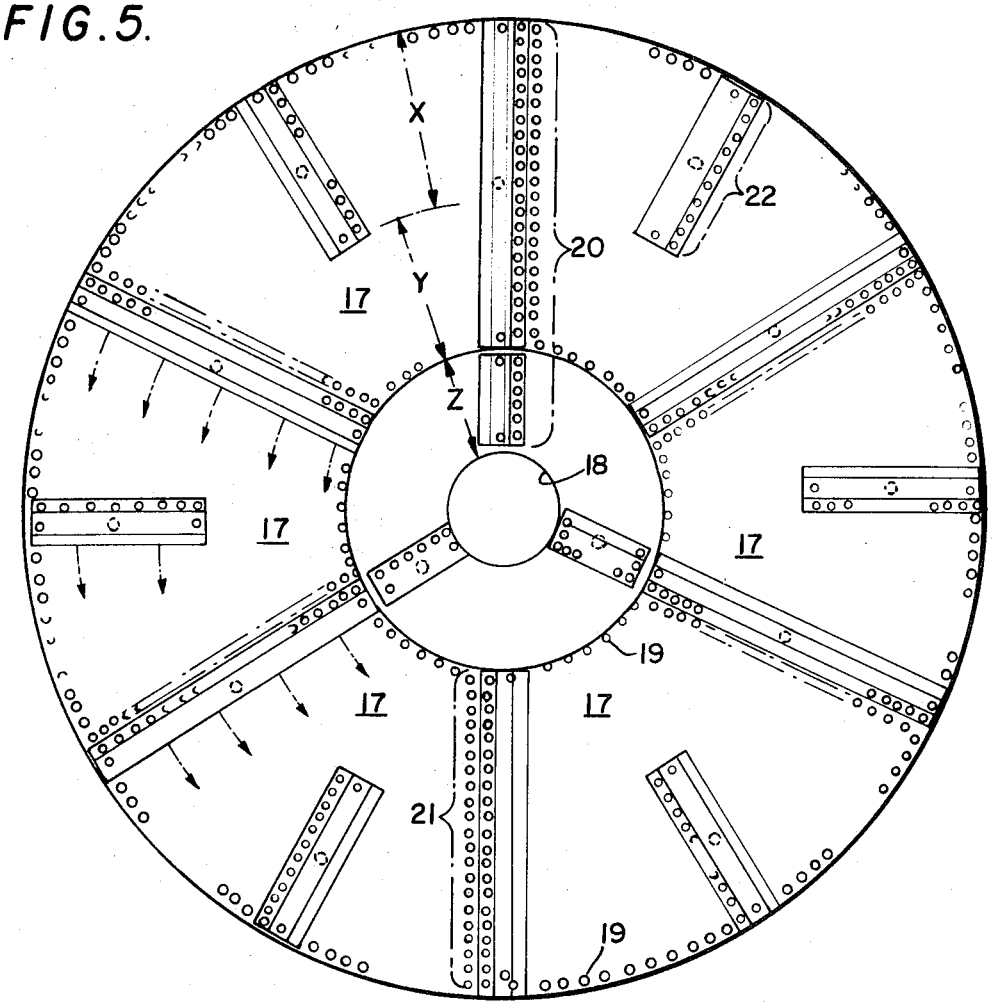
FIG. 5 is a view of the interior of a hopper as seen from directly above and illustrating a particular air channel arrangement.

FIG. 5 illustrates an arrangement in which the hopper is made from six segments 17 and a cone-shaped ring having an outlet opening 18, all parts are bolt connected together as at 19 in the manner shown in FIGS. 3 and 4.

As is clear from this view, the interior of the hopper portion has the air channels arranged and connected therein so that some channels 20 extend the full height of the cone-shaped structure, other channels 21 extend approximately two thirds the height downwards from the upper limit of such cone-shaped structure. While still other channels 22 extend over about one third the height downwards from the upper limit of the cone formation. This arrangement divides the hopper interior into upper, intermediate and lower zones X, Y and Z respectively. Thus, with air issuing counterclockwise from beneath the unbolted edges of all the strips that define the channels, there are twelve channel lengths in zone X, six in zone Y and three in zone Z, thus creating a diminishing centrifugal agitation effect from the upper zone to the lower zone. In other words, as the diameter of the zones decreases, the volume of air flowing approximately tangentially into and centrifugally thereof can also be decreased while still preventing arching of the material within the hopper interior during discharge.

Figure 6:
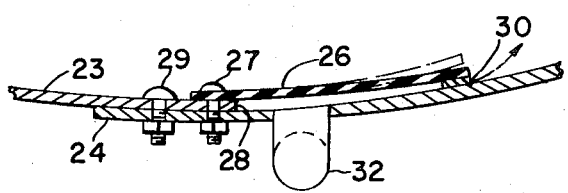
FIGS. 6 and 7 are fragmentary views illustrating a modified form of seam bridging air channel forming strip with FIG. 6 being a horizontal cross-sectional view, and FIG. 7 a bottom view of the strip as seen inwardly of the hopper wall surface.
Figure 7:
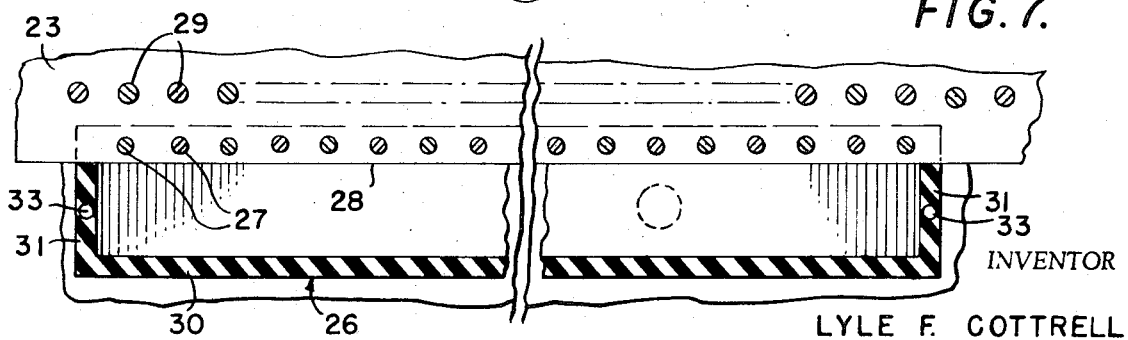

FIGS. 6 and 7 indicate a further air channel defining strip arrangement in which the strips overlie or bridge the radial seams of the conical portion of a hopper. Thus, portions of adjacent segmental sections 23 and 24 are overlapped. A strip length 26 is bolt connected to these segmental sections as at 27 so that the strip extends circumferentially of the sections and beyond the edge 28 of section 24. The bolt connections between the sections are shown at 29. The strip lengths 26 are provided with a molded neoprene seal that extends along the free edge at 30 and along the end edges as at 31. The seal portions 31 have ends that abut against the edge 28 of section 24 and the depth of the seal is at least as great as the thickness of the plate section 23 so that an air chamber or channel is formed inwardly of the hopper wall surface to receive air from a branch line or pipe 32 that in turn is fed from a manifold ring as in FIG. 1.

In some instances, it may be desirable to use bolt connections as at 33 to hold the end edge seals 31 against the hopper wall surface.

Therefore, the invention broadly contemplates the securing of a plurality of circumferentially spaced, elongated strip means in the inner wall surface of a cylindrical or conical hopper portion along one edge of each of such strip means. The strip means being either trough shaped or bridging over a radial seam of a hopper so as to provide an elongated air channel inwards of the hopper wall surface that extends radially of the axis of the bottom discharge opening. The free side edges of all the strip means face in the same direction circumferentially of the hopper and at least some of the circumferentially spaced strip means are coextensive in length with the vertical extent of the conical portion of the hopper.

Further, the free edges of all the strip means contact the inner wall surface of the hopper so as to prevent ingress of granular material into the air channel when pressurized air is not being introduced thereinto.

The strip means can be extruded of metal or plastic or molded of plastic material. A seal bead can be integrally formed on a plastic strip or a separate and resilient seal of plastic or rubber can be secured along the free edge of a metal strip.

In any event, the construction should be such that the air channels are initially sealed with at least a line contact along the free outlet edges thereof relative to the hopper wall surface and possess such resiliency characteristics that the pressurized air entering the channels issues from beneath the free edges thereof in elongated, flat sheet-like jets or streams to provide the circumferentially flowing air film between the hopper wall surface and the adjacent or hopper opposing mass of material therein.

While the drawings disclose a conical hopper construction, it should be understood that the invention is not to be limited thereto but is applicable to a cylindrical wall surface of a storage bin since the action of the tangential air flow would be substantially the same.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. In a method of facilitating the flow of material through a shaped hopper portion of a storage chamber to a lower outlet so as to relieve or prevent arching stoppage of material in such portion, the improvement comprising introducing into such portion from a plurality of circumferentially spaced air channel means a plurality of circumferentially spaced pressurized air streams in elongated sheet-like form, at least some of which are substantially coextensive in height with the height of such shaped hopper portion, directing all streams to enter the interior of such hopper portion approximately tangentially of the axis thereof and in the same direction to form a hopper lining film of compressed air between the wall of such hopper portion and the opposing surface of the mass of material therein, so as to impart a centrifugally directed agitating effect on the mass of material while also imparting a moment of force on the material acting inwards of the wall due to the expansion of the film of compressed air between the wall and the wall opposing surface of the mass of material, and sealing said air channel means to prevent ingress of the material into the air channel means when air is not being introduced thereinto.

2. In a method as defined in claim 1 wherein the shaped hopper portion is conical and introducing and directing more circumferentially spaced sheet-like air streams in the upper portion of such conically shaped hopper portion than in the lower portion of such hopper portion.

3. In a method as defined in claim 2 and decreasing the number of introduced and directed sheet-like air streams in a downward direction to form at least three superposed zones of a compressed air film within the conically shaped hopper with the volume of introduced air diminishing downwardly from zone to zone.

4. In a hopper having a conically shaped wall leading to a discharge opening for the discharge of granular or powdery material, a plurality of circumferentially spaced elongated strip means having opposite side edges and secured along at least one side edge to the inner surface of such wall so as to extend vertically along such wall, a portion of each strip means spaced from said wall and defining an elongated air channel therewith, the other side edge of each strip means being free of connection with said wall, all said other side edges of said strip means facing in the same direction circumferentially of said wall and cooperating with said wall so as to constitute elongated outlet nozzles, and means for introducing compressed air into said air channels to flow outwardly thereof beneath said other side edges of said strip means to form a hopper lining film to relieve or prevent arching stoppage of material in the hopper.

5. In a hopper as claimed in claim 4 and at least some of said strip means being at least approximately coextensive in height with the height of said wall.

6. In a hopper as defined in claim 5 and shorter strip means arranged between said at least some strip means in an upper zone of said wall so that the volume of introduced compressed air is greater in said upper zone.

7. In a hopper as defined in claim 4 and said wall including segmental members secured together with one longitudinal edge of one member overlapping the adjacent longitudinal edge of the adjacent member, one overlapping edge of each member being on the inner face of said wall, all of said one overlapping edges facing in the same direction and said strip means being secured to said members inwardly of said one overlapping edges thereof and having a width such as to extend beyond said one overlapping edges.

8. In a hopper as defined in claim 7, and said elongated strip means including a flat portion along one longitudinal side edge for attachment to one of said members, an intermediate trough shaped portion for overlying said one overlapping edge and a free edge portion making at least a line contact with the adjacent member.

9. In a hopper as claimed in claim 7, and each said strip means comprising an elongated flat strip having a width sufficient to provide for attachment to one segmental member, and to extend over and beyond each said one overlapping edge, and a protruding rim portion extending along the free edge of said strip and along the end edges thereof from said free edge to said one overlapping edge.

10. In a hopper having a wall leading to a discharge opening for the discharge of granular or powdery material, a plurality of circumferentially spaced strip means each secured along at least one side edge to the interior of the wall so as to extend vertically along such wall, the opposite side edge of each said strip means having a wall contacting portion making at least a line contact with such wall, at least said wall contacting portion being yieldable, all said yieldable portions facing in the same direction, at least a portion of said strip means spaced from said wall and defining elongated air channels interiorly of such wall, and means for introducing compressed air into such channels to flow out beneath such yieldable portion to form a hopper lining film of compressed air to relieve or prevent arching stoppage of material in the hopper.

* * * * *